(12) United States Patent
Jones

(10) Patent No.: US 11,529,770 B2
(45) Date of Patent: Dec. 20, 2022

(54) MOULDING METHOD

(71) Applicant: Gurit (UK) Ltd., Newport (GB)

(72) Inventor: Daniel Thomas Jones, Cowes (GB)

(73) Assignee: Gurit (UK) Ltd., Hampshire (GB)

( * ) Notice: Subject to any disclaimer, the term of this patent is extended or adjusted under 35 U.S.C. 154(b) by 510 days.

(21) Appl. No.: 16/493,072

(22) PCT Filed: Mar. 13, 2018

(86) PCT No.: PCT/EP2018/056259
§ 371 (c)(1),
(2) Date: Sep. 11, 2019

(87) PCT Pub. No.: WO2018/167072
PCT Pub. Date: Sep. 20, 2019

(65) Prior Publication Data
US 2020/0070435 A1 Mar. 5, 2020

(30) Foreign Application Priority Data
Mar. 13, 2017 (GB) .................... 1703992

(51) Int. Cl.
| B29C 70/12 | (2006.01) |
| B29B 11/16 | (2006.01) |
| B29C 70/18 | (2006.01) |
| B29C 70/46 | (2006.01) |
| B29C 70/44 | (2006.01) |
(Continued)

(52) U.S. Cl.
CPC ............. *B29C 70/12* (2013.01); *B29B 11/16* (2013.01); *B29C 70/18* (2013.01); *B29C 70/44* (2013.01);
(Continued)

(58) Field of Classification Search
CPC ......... B29C 70/18; B29C 70/12; B29C 70/30; B29C 70/44; B29C 70/46; B29B 11/16; B29B 9/04
See application file for complete search history.

(56) References Cited

U.S. PATENT DOCUMENTS

| 6,838,148 B1 * | 1/2005 | Ehnert | ................ B29C 43/34 |
| | | | 428/297.4 |
| 9,180,627 B2 * | 11/2015 | Masini | ................ B29C 70/46 |

(Continued)

FOREIGN PATENT DOCUMENTS

| EP | 0415436 A1 * | 3/1991 | ............ B29C 70/14 |
| EP | 0415436 A1 | 3/1991 | |

(Continued)

OTHER PUBLICATIONS

English Translation of Sarlin (EP 1134314) (Year: 2001).*
(Continued)

*Primary Examiner* — Matthew J Daniels
*Assistant Examiner* — Hana C Page
(74) *Attorney, Agent, or Firm* — Polsinelli, P.C.

(57) ABSTRACT

Method of moulding a moulding material to form a moulded part of carbon fibre-reinforced resin matrix composite material in which a sheet moulding compound is moulded which can provide panels, for example for use as vehicle body panels, which have the combination of very low thickness, very light weight, very low warping and surface defects, and very low anisotropy with regard to localised fibre and resin distribution and their associated appearance and mechanical properties.

43 Claims, 5 Drawing Sheets

(51) Int. Cl.
  *B29K 101/10* (2006.01)
  *B29K 105/08* (2006.01)
  *B29K 307/04* (2006.01)

(52) U.S. Cl.
  CPC .......... *B29C 70/46* (2013.01); *B29K 2101/10* (2013.01); *B29K 2105/0863* (2013.01); *B29K 2307/04* (2013.01)

(56) References Cited

U.S. PATENT DOCUMENTS

2014/0099484 A1* 4/2014 Roberts, III ............ B32B 27/38
  156/60
2015/0355111 A1   12/2015 Boursier

FOREIGN PATENT DOCUMENTS

| EP | 1134314 A1 | 9/2001 |
| WO | 2004030906 A1 | 4/2004 |
| WO | 2013128312 A1 | 9/2013 |
| WO | 2016006543 A1 | 1/2016 |

OTHER PUBLICATIONS

"Sheet Molding Compounds" (Available Jul. 10, 2016, https://www.idicomposites.com/smc-bmc-overview.php) (Year: 2016).*
English Translation of Leblond (EP1134314). (Year: 2010).*
International Preliminary Report on Patentability in corresponding International Application No. PCT/EP2018/056259 dated Sep. 17, 2019.
International Search Report and Written Opinion in corresponding international application No. PCT/EP2018/056259 dated Jun. 22, 2018.
Combined Search and Examination Report in corresponding GB application No. 1703992.6 dated Sep. 14, 2017.
Examination Report under Section 18(3) in corresponding GB application No. 1703992.6 dated Jun. 27, 2019.

* cited by examiner

MOULDING METHOD

FIELD OF THE INVENTION

The present invention relates to a method of moulding a moulding material to form a moulded part of fibre-reinforced resin matrix composite material. In particular, the present invention relates to such a method which is for manufacturing moulded parts composed of carbon fibre reinforced resin matrix composite materials, such as, for example, panels, more particularly automotive body panels.

BACKGROUND

It is known to produce moulded parts for various applications, and having various shapes and configurations, by moulding materials including polymer resins, in particular for the manufacture of moulded parts composed of fibre reinforced resin matrix composite materials. Such composite materials are typically manufactured from moulding materials which may typically comprise, for example, (a) the combination of dry fibres and liquid resin, (b) prepregs and/or (c) sheet moulding compounds (SMC). Other materials may also be present, such as sandwich core materials and surfacing layers for forming a desired surface finish on the moulded part.

Many products are moulded by a manual process of laying-up the moulding material into a one sided mould, which moulds a single side of the resultant moulded article. Other products require a two-sided moulding process. In order to provide high manufacturing tolerance to the two-sided moulded part, it is sometimes required to use a press-moulding process in which the moulding material is moulded in a closed mould under elevated pressure.

Known SMC materials and methods for manufacturing carbon fibre parts from SMC materials tend to provide parts which are thick and/or heavy. In addition, the parts tend not to have a good surface finish.

There is a problem with SMC moulding processes, particularly when manufacturing carbon fibre reinforced resin matrix composite materials, that it is difficult to provide a thin and lightweight panel which does not exhibit warping or other dimensional defects. For example, a vehicle body panel made of composite material must be thin and lightweight, but must not exhibit warping away from the designed three dimensional shape. When a panel is moulded from SMC material, even though the peripheral edge of the panel may have been clamped during moulding of the panel, which provides the peripheral edge with the desired shape and dimensions within acceptable design and manufacturing tolerances, the central part of the panel may be outside those tolerances.

The SMC material typically comprises a distribution of short fibres (for example carbon or glass fibres), filler material (for example inorganic particulate filler such as calcium carbonate) and polymer resin, which may be a thermoplastic resin, such as a polyester or polyolefin, or a thermosetting resin, such as an epoxy resin or vinyl ester resin. The fibres are relatively short, for example about 25 mm long, which means that during the moulding process the fibres can flow around bends and corners and so can readily form 3-dimensional moulded parts. For example, as compared to prepregs which comprise fabrics, typically woven, multiaxial or unidirectional fabrics, SMC material can more readily form profiled parts having variations in thickness and curvature without encountering fabric creasing which may be a problem using prepregs.

During the SMC moulding process, typically a charged dose of the SMC material is placed in a mould tool and then the charged dose is compressed within the mould cavity to produce the final moulded part. The charged dose of the SMC material typically has a preset weight/volume which substantially corresponds to or is slightly greater than that of the final moulded part. Such a slightly greater weight/volume produces resin flash around the periphery of the moulded part which requires removal, for example by grinding/filing away, but the excess material is more likely to provide a fully moulded part as compared to the use of a charged dose of the SMC material intended precisely to match the weight/volume of the final moulded part.

The charged dose of the SMC material typically has an initial thickness that is significantly greater than the thickness of the final moulded part, which latter thickness is defined by the height of the mould cavity. Correspondingly, the charged dose of the SMC material typically has a plan shape and area that is significantly less than the plan shape and area of the final moulded part. For example, typically the charged dose of the SMC material covers from 50 to 70% of the plan area of the mould cavity.

The compression of the SMC material causes the resin to flow within the mould cavity and in particular to flow from a central part of the cavity to the peripheral extremities of the cavity. Typically, the extremities of the cavity may have reduced height, which makes it more difficult to have uniform and predictable flow of the SMC material into these extremities. Also, as the height of the cavity decreases, so the moulding pressure tends to need to be increased to ensure that the moulding pressure is sufficient to distribute the SMC material throughout the mould cavity so that the peripheral edge and moulded details of the moulded part are accurately moulded with the desired surface, shape, dimensions, properties and appearance.

This flow phenomenon can result in localised anisotropic resin flow in some areas of the moulded part which can result in localised anisotropic properties in the panel. These localised anisotropic properties in the panel can be manifested in visual warping of the panel, either at ambient temperature or when subjected to temperature fluctuations; visual surface defects, for example a resin swirling or rippling pattern or resin surface unevenness; and/or non-visual properties, for example localised residual stresses, that may eventually result in visual defects, such as warping. In general, such defects are more prevalent the thinner the thickness of the moulded part and the larger the area of any planar unreinforced portion of the moulded part.

Glass fibre parts moulded from SMC materials typically have a glass fibre volume fraction of about 20% and a high filler content. This filler provides an increase in the isotropic properties of the moulded part; for example in the centre of a panel the thermal expansion coefficient is substantially uniform and isotropic, and there are minimal residual stresses in the moulded part, particularly if reinforcing elements such as ribs are integrally moulded. However, the filler reduces the mechanical properties of the panel and increase the weight and thickness for achieving a given mechanical performance. When moulding carbon fibre parts, these problems of warping and residual stresses resulting from localised anisotropy can be exacerbated as compared to glass fibre parts since carbon fibre has a very high tensile modulus and a low coefficient of thermal expansion as compared to glass fibre. Also, a typical carbon fibre volume fraction (Vf) is 40 to 55% and the filler content is zero or low with the aim to minimise weight by having a high specific stiffness. Consequently, the higher modulus carbon fibre tends to increase distortions and warping resulting from anisotropy in the distribution of the SMC fibres and resin throughout the moulded part.

For many SMC moulded parts, which have complex features, and particularly when thin cross-sections require to be moulded, the moulding pressure needs to be very high, typically 60-120 bar, to achieve good moulding quality. The mould tools configured to operate at such high pressures have capital and operational costs.

Moreover, since the SMC material comprises fibres which are required to flow while suspended in a flowable resin during the moulding process, it is difficult to mould thin parts, as the fibres tend to act as a clogging mechanism resisting the flow and causing back pressure to build up in thinner parts of the moulding cavity.

It is known to make glass fibre vehicle body panels from SMC material by a press moulding process. A typical SMC-manufactured glass fibre vehicle body panel thickness is from 2 to 3 mm. It is also known to make carbon fibre vehicle body panels from SMC material by a press moulding process. Currently, the thinnest carbon fibre vehicle body panel is reported to have a thickness of 1.7 mm. Such known panels must be manufactured using high pressure mould tools, which increases the manufacturing costs of such panels.

There is still a desire to make even thinner, and consequently even more lightweight, panels, in particular for vehicles.

SUMMARY OF THE INVENTION

It is accordingly an aim of this invention to provide a method of moulding a moulding material to form a moulded part of fibre-reinforced resin matrix composite material in which a sheet moulding compound is moulded which at least partially overcomes at least some of these significant disadvantages of the known SMC moulding materials and methods currently used to manufacture moulded parts of fibre reinforced resin matrix composite material.

It is a particular aim of this invention to provide a method of moulding a moulding material to form a moulded part of carbon fibre-reinforced resin matrix composite material in which a sheet moulding compound is moulded which can provide panels, for example for use as vehicle body panels, which have the combination of very low thickness, very light weight, very low warping and surface defects, and very low anisotropy with regard to localised fibre and resin distribution and their associated appearance and mechanical properties.

The present invention provides a method of moulding a moulding material to form a moulded part of fibre-reinforced resin matrix composite material, the method comprising the steps of:

i. providing a plurality of layers of sheet moulding compound, each layer comprising a plurality of ribbons randomly distributed across the plane of the respective layer and at least partly coated by a resin, each ribbon comprising a bundle of mutually aligned carbon fibres and being randomly oriented within the plane of the layer, in each layer of sheet moulding compound the ribbons are distributed to cover less than 100%, optionally from 90 to 99%, of the layer area, relative to the plane of the layer;
ii. assembling the plurality of layers as a stack;
iii. locating the stack in a moulding area of a mould tool, the mould tool defining a peripheral edge of the moulding area, wherein the stack of layers is shaped and dimensioned to cover from 90 to 100% of the moulding area and a peripheral edge of the stack is located at or inwardly of the peripheral edge of the moulding area, the stack of layers defining a panel part;
iv. applying a moulding pressure to an upper surface of the stack and causing the sheet moulding compound to flow and fill a mould cavity, defined by the moulding area, of the mould tool; and
v. solidifying the resin to form a moulded part from the moulding material, wherein the moulded part includes a panel portion formed from the panel part.

In some particularly preferred embodiments, the moulding material and the moulded part are panel shaped, optionally the moulded part being an automotive body panel.

In any of the embodiments, the resin preferably comprises a curable thermosetting resin, optionally an epoxy resin or a vinyl ester resin.

Accordingly, the present invention provides a method which is particularly suitable for manufacturing parts composed of fibre reinforced resin matrix composite materials, such as, for example, panels, more particularly automotive body panels which are fully impregnated and require no or limited subsequent trimming, machining or rework operations.

The present invention is at least partially predicated on the surprising finding by the present inventors that the moulding process for SMC moulding materials can be controlled to provide the combination of very thin and lightweight carbon fibre panels which have very low warping. This is achieved by providing a very high degree of local isotropy with respect to the carbon fibre and resin distribution throughout the panel. The carbon fibre panel can exhibit high stiffness and high dimensional accuracy, i.e. low warping, particularly at locations remote from the peripheral edge of the panel, with very low panel thickness of from 0.7 to 1.5 mm, typically from 0.8 to 1.2 mm, even in panels having a surface area of greater than 1 $m^2$, and even greater than 2 $m^2$.

The panel is formed from SMC moulding materials which have been preconditioned to provide flattened ribbons, each containing a plurality of carbon fibres. A random distribution of the ribbons is provided in a resin layer to form an individual layer of SMC moulding material. A plurality of the individual layer of SMC moulding material is assembled to form a stack which is then moulded to form the final moulded composite material.

The moulding step is carried out so that the flow of resin during the moulding step is minimised, and is typically significantly less than in a conventional SMC moulding process, particularly for the manufacture of panels. Not only is the volume of the resin flow reduced, but also the maximum distance that liquid resin needs to flow is reduced.

The reduced resin flow reduces resin swirling, resin turbulence, resin wave effects, resin bounce-back from the mould edges and back pressure from the resin. The back pressure in known SMC moulding processes can otherwise prevent the extremities of the mould cavity being filled with resin, either at all leaving voids, or at the required minimum moulding pressure, leaving mechanical weakness. The back pressure in known SMC moulding processes increases the need for a high applied moulding pressure. The resin turbulence and related effects align the fibres in the resin flow direction, causing fibre anisotropy, weak spots and visual defects. The fibres may be locally distorted, forming anisotropic fibre distributions. This reduces the mechanical properties of the moulded part, and can lead to distortion and warping, particularly when the part is subjected to temperature fluctuations. These problems are exacerbated in carbon fibre products which use high modulus carbon fibres.

Conventional SMC processing cannot currently produce a thin carbon fibre panel which has a consistent A-surface paintable finish over a moulded surface area.

In contrast, the method of the present invention can use significantly lower moulding pressures, for example less than 20 bar, and even as low as 1 bar, corresponding to atmospheric pressure used in a vacuum moulding process, and can therefore employ lower pressure mould tools at significantly lower capital and operating cost, as compared to known SMC moulding processes.

The SMC moulding process of the present invention can even employ a vacuum moulding process, for example using a manually laid-up vacuum bag process well known to those skilled in the art, in which the moulding pressure is atmospheric pressure.

The reduced resin flow also minimises fibre alignment which can otherwise occur when SMC fibres are caught up in a flowing resin during the moulding process. This reduced resin flow minimises any resin flow artefacts in the cured resin product, such as swirling, fibre alignment and localised fibre or resin anisotropy. This enhances the visual appearance of the moulded surface and also minimises dimensional defects such as warping.

The stack of the plurality of individual layers of SMC moulding material can readily be preformed to a desired three-dimensional shape prior to moulding. The preform may be prepared by an off-line process such as on a planar vacuum consolidation table, and then preformed, drape laminated, etc.

The individual layers of SMC moulding material are extremely thin. The layers also have isotropic mechanical properties because of the random orientation of the ribbons of carbon fibres within each layer. The individual layers of SMC moulding material can readily be laid up, using draping under the action of gravity, hand pressure, or other shape forming methods, as required, to any desired three dimensional surface profiling on a mould surface. Localised layers may be added as local reinforcements, or pads, to provide localised strengthening in the resultant moulded product or localised changes in thickness. Also, fitments, for example bolts or other fittings, may readily be incorporated into the stack during the assembly of the individual layers of SMC moulding material.

The random orientation of the ribbons of carbon fibres provides a visually isotropic appearance to the surface of the resultant moulded product. The surface is consequently visually attractive and smooth. The highly isotropic surface reduces the level of fibre "print-though" if the surface is subsequently coated with a surfacing film of resin, and optionally painted. Since the fibres at the surface have a highly random arrangement, apart from within individual ribbons which have small dimensions, when the surface is coated with a resin film there is minimal visible witnessing of the underlying fibre orientations when the resin-coated surface, optionally painted, is viewed. Consequently, the preferred embodiments of the invention can improve the surface properties of the moulded part, particularly at the "A-surface" where a surfacing resin layer may be provided as the front face of the moulded part.

The press moulding method of the invention may be employed for the press or vacuum moulding of such carbon fibre moulding materials, and may be used in a variety of applications, including but not limited to the press moulding of automotive body parts.

The press moulding method of the invention may be employed to produce high volume, lightweight, high dimensional quality and high surface quality low cost automotive body panels composed of composite material, and such production may incur minimal labour costs as a result of reducing or avoiding post-moulding finishing costs.

The resin composition may be selected to have a high degree of cross-linking, so as to have a high glass transition temperature Tg, with the result that the moulded part is able to be conveyed along a high temperature paint line without distortion or surface damage to maintain what is categorised for automotive body panels by those skilled in the art as a "class A" surface finish.

BRIEF DESCRIPTION OF THE DRAWINGS

Embodiments of the present invention will now be described by way of example only, with reference to the accompanying drawings, in which.

DETAILED DESCRIPTION

In each of the Figures, some dimensions, in particular of the moulding material and its component layers, are not illustrated to scale, but are enlarged for the purpose of clarity of illustration.

Figure 1:
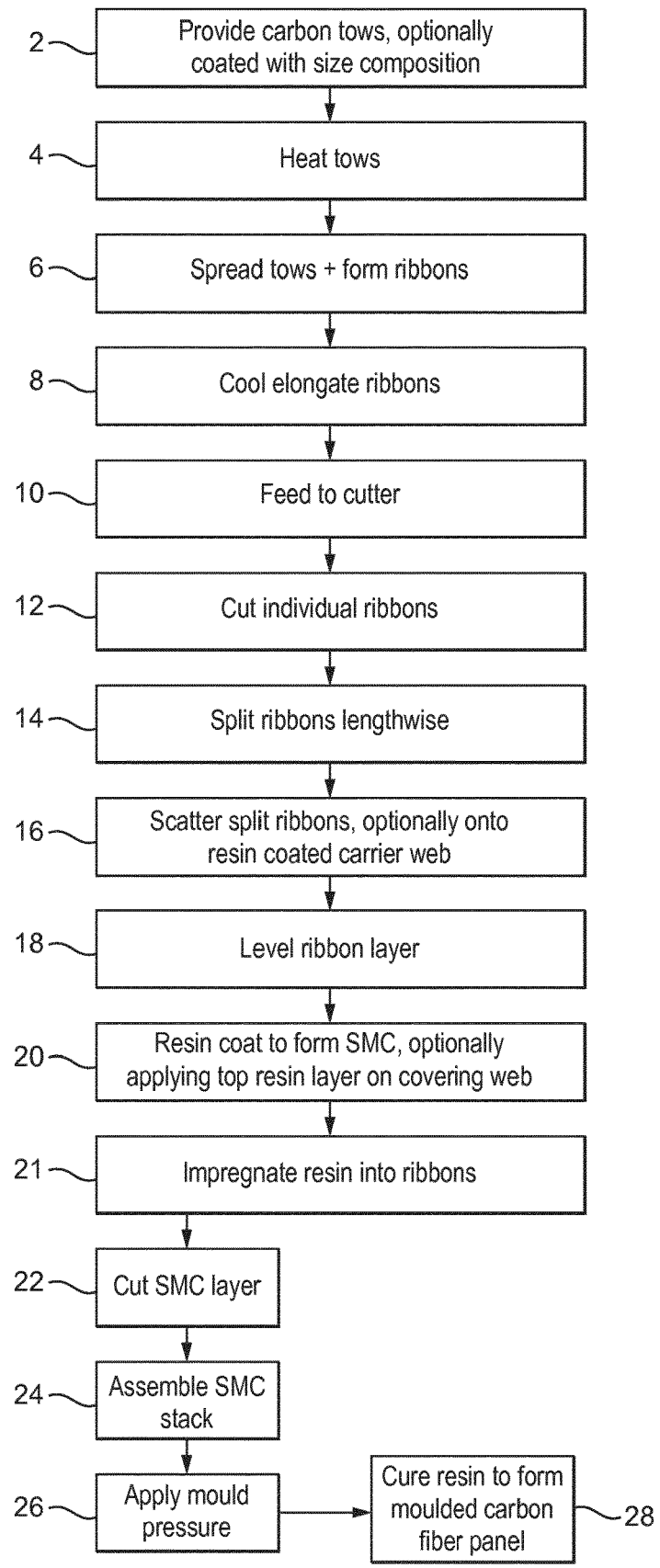
FIG. 1 is a process flow diagram schematically illustrating sequential steps in a moulding method in accordance with an embodiment of the present invention.

Referring to FIG. 1, there is shown a schematic flow diagram of a method of moulding a moulding material to form a moulded part of fibre-reinforced resin matrix composite material in accordance with a preferred embodiment of the present invention.

Figure 2:
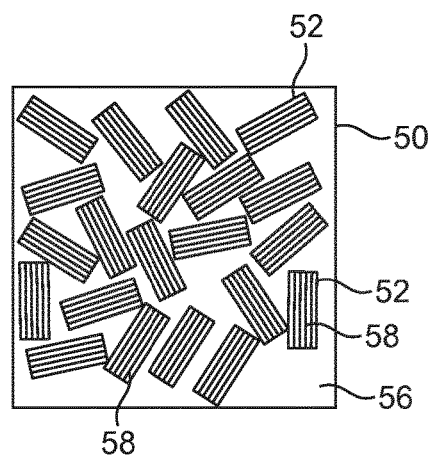
FIG. 2 schematically illustrates a plan view of a layer of sheet moulding compound (SMC) produced in the method illustrated in FIG. 1.

In the method, a plurality of layers 50 of sheet moulding compound (SMC) are produced. As illustrated in FIG. 2, which is highly schematic and shows only a few fibres per ribbon, each layer 50 comprises a plurality of ribbons 52 randomly distributed across the plane of the layer 50 and a resin 56, typically a curable thermosetting resin, substantially uniformly distributed over the layer 50.

Each ribbon 52 comprises a bundle of mutually aligned carbon fibres 58. Typically, each ribbon 52 comprises from 2,000 to 50,000 carbon fibres. In each layer 50 the curable resin 56 impregnates the carbon fibres 58 in the ribbons 52. Each ribbon 52 is independently randomly oriented within the plane of the layer 50. The result is that the plurality of ribbons 52 provides a substantially isotropic or quasi-isotropic distribution of carbon fibres in the layer 50. Within each ribbon 52 the fibres 58 are locally aligned, in fact parallel, but the individual ribbons 52 are randomly oriented. The overall result is an isotropic and substantially uniform fibre distribution over the plan area of the layer 50.

Typically, each layer 50 of sheet moulding compound has a carbon fibre volume fraction of from 40 to 55% relative to the total volume of the carbon fibres 58 and resin 56 in the layer 50.

Typically, the ribbons 52 have one or more, in any combination, of the following parameters: the ribbons 52 have a carbon fibre weight per unit area, the area of the ribbon 52 being measured in the plane of the layer 50, and in the plane of the ribbons 52, of from 30 to 200 $g/m^2$, optionally from 30 to 100 $g/m^2$, optionally from 50 to 100 $g/m^2$ or from 40 to 70 $g/m^2$; the ribbons 52 have a length, measured along the mutually aligned fibres, of from 3 to 25 mm, optionally from 3 to 18 mm, further optionally from 5 to 13 mm; the ribbons 52 have a width, measured transverse to the mutually aligned fibres, of from 1 to 32 mm, optionally from 1 to 16 or 20 mm, further optionally from 1 to 8 mm, yet further optionally from 1 to 4 mm.

The ribbons 52 typically have an average thickness of from 0.04 to 0.3 mm, optionally from 0.04 to 0.12 mm, or from 0.04 to 0.10 mm, or, or from 0.04 to 0.08 mm, or from 0.04 to 0.10 mm, or from 0.05 to 0.12 mm, or from 0.05 to 0.10 mm. The thickness is measured after curing of the resin containing the ribbons.

In each layer 50 of sheet moulding compound the ribbons 52 are distributed to form a monolayer of ribbons 52 within the layer 50. The provision of a monolayer means in this specification that there is minimal or no overlap of the ribbons 52 within the layer 50; typically for the ribbons 52 in the layer 50, less than 10%, preferably less than 5%, of the total plan area of the ribbons 50 in the layer 52 is constituted by overlapping ribbons 52 within the layer 50. Typically, in each layer 50 of sheet moulding compound the ribbons 52 are distributed to cover from 90 to 99% of the layer area, relative to the plane of the layer 50. Thereafter, after a plurality of the layers 50 are assembled top form a stack, as described hereinafter, in the stack of the plurality of layers of sheet moulding compound, the ribbons in the plurality of layers of sheet moulding compound at least partly overlap so that in the stack the ribbons are distributed to cover 100% of the stack area, relative to the plane of the stack.

Figure 3:
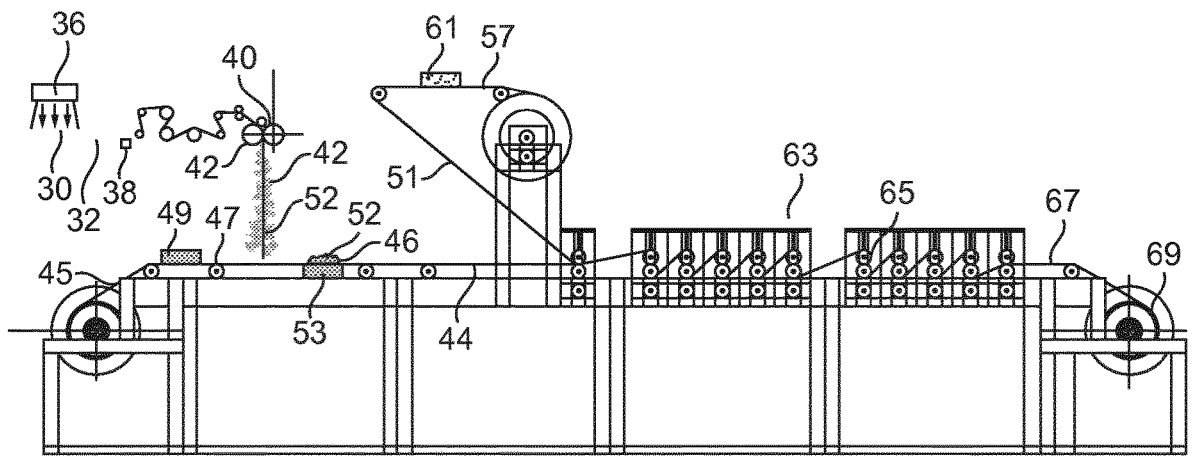
FIG. 3 schematically illustrates an apparatus for producing ribbons of carbon fibres in the method illustrated in FIG. 1.

In the preferred embodiment, the layer of sheet moulding compound 50 is formed by the following steps, as shown in FIG. 1. Referring to FIG. 1, and also FIG. 3 which shows the apparatus used to form carbon fibre ribbons, in step 2 a plurality of parallel elongate tows 30 of carbon fibres is provided. These tows 30 form a web 32 of the plurality of parallel elongate tows 30. Each tow 30 typically comprises from 10,000 to 50,000 carbon fibres; i.e. as well known to those skilled in the art, each carbon fibre tow 30 may range from a 10k tow to a 50k tow.

The elongate tow 30 typically comprises carbon fibres coated with a resin size composition, which is conventional in the art, the size composition being used to bind together the filaments in the tow 30 in order to minimize or prevent fibre breakage, fibre splitting and fibre fraying in the tow.

In step 4 the elongate tow 30 is heated to soften the resin size composition. The elongate tow 30 is typically heated by electromagnetic radiation, for example infrared radiation, from a radiation source 36.

Then, in step 6, each tow 30 is spread to form an elongate ribbon 34. The tow 30 is spread by a spreader 38, for example a flattened spreader bar, to form the elongate ribbon 34 while the resin size composition is in a softened state.

The spread ribbon 34 is then cooled in step 8, either by cooling directly or by being allowed to cool, in order to harden the resin size composition. This hardened resin size composition stabilises the flattened ribbon-shaped morphology of the spread ribbon 34.

Optionally, a binder composition is applied to the elongate spread ribbon 34 of carbon fibres to stabilize the ribbon and hold together the carbon fibres within the ribbon, optionally using heat to soften the binder.

Then the stabilised spread ribbon 34 is fed to a cutter 40 in step 10. The cutter is a well-known device used for cutting carbon fibre or glass fibre tows to produce shortened filaments for the production of SMC moulding compositions.

In step 12 the elongate spread ribbon 34 is cut transverse to the length of the ribbon 34 by the cutter 40 to form a plurality of individual ribbons 42.

Preferably, the web 32 is conveyed through a common spreader 38, which spreads the tows 30 of carbon fibres to form a plurality of parallel elongate spread ribbons 34, and is then conveyed into a common fibre cutter 40 which cuts the plurality of elongate spread ribbons 34 to form the plurality of individual ribbons 42.

Alternatively, only a single elongate tow of carbon fibres is provided which is individually treated as above, namely spread and then cut, to form the plurality of individual ribbons 42.

In a preferred embodiment, the plurality of ribbons 42 are mechanically worked in a splitting step 14 to split, lengthwise in a direction along the fibre direction, at least some of the plurality of individual ribbons 42 formed in step 12 into respective two or more ribbons 52 of smaller width, transverse to the fibre direction, as compared to the individual ribbons 42 formed in step 12. Typically, at least some of the plurality of individual ribbons 42 which are split are formed into at least three ribbons 52 of smaller width. The splitting step may comprise simple mixing or tumbling of a volume of the ribbons 42 which may apply a shear force to cause at least some of the ribbons 42 to be split lengthwise.

Typically, prior to the splitting step 14 the ribbons 42 have a width of from 8 to 44 mm and after the splitting step 14 the ribbons 52 have a width of from 1 to less than 20 mm or from 1 to less than 8 mm. Alternatively, prior to the splitting step 14 the ribbons 42 have a width of from greater than 4 to up to 30 mm, optionally up to 16 mm, and after the splitting step 14 the ribbons 52 have a width of from 1 to 10 mm, optionally up to 4 mm. Prior to the splitting step 14 the ribbons 42 typically comprise from 10,000 to 50,000 carbon fibres and after the splitting step 14 the ribbons 52 comprise from 2,000 to 20,000 carbon fibres. If the splitting step is not implemented, the cut ribbons 52 are subsequently employed to produce the layer 50 and these cut ribbons 52 may have any of these parametric ranges for ribbon width and/or number of carbon fibres per ribbon.

In step 16, the plurality of split ribbons 52, or cut ribbons 42 if the splitting step is not implemented, are scattered onto a surface 44 to form a layer 46 of the plurality of ribbons 52 which are randomly distributed across the plane of the respective layer 46. The surface 44 typically comprises a flexible carrier web 45, for example a polymer film, for temporarily carrying and coating the resultant SMC layer. The carrier web 45 may be translated along the web direction below a stationary scattering device 42 which scatters the ribbons onto the moving web to form a layer of ribbons 52 along the web 45.

In step 18, after or as the plurality of ribbons 52 are scattered onto the surface 44, a levelling force is applied to the plurality of ribbons 52 to level out the distribution of the plurality of ribbons 52 across the plane of the layer of the plurality of ribbons 52. This levelling effect forms a layer of ribbons 52 which has substantially uniform height. Any significant unevenness in the height of the layer of scattered ribbons, the unevenness being manifested in "hills" or "piles" of multiple ribbons and associated "valleys" with no ribbon, can be levelled to displace ribbons from the hills into the adjacent valley and thereby achieve a more uniform layer thickness with minimum ribbon overlap.

The levelling force may be applied to the plurality of ribbons 52 by vibrating the layer 46 of the plurality of ribbons 52 by a vibrating device 53 to level out the distribution of the plurality of ribbons 52 across the plane of the layer 46 of the plurality of ribbons 52. The vibration causes individual ribbons to vibrate, i.e. "dance", and fall downwardly into a lower position. The levelling significantly reduces ribbon overlap and causes a substantial monolayer of ribbons to be formed. The area coverage of the ribbons can be increased by the levelling, typically to a ribbon coverage of from 70 to 90%, with no or minimal ribbon overlap.

In one embodiment, in steps 16 and 18 the layer 46 of the plurality of ribbons 52 is formed on a conveyor 48 and the conveyor surface 44 is vibrated to provide the levelling force. The vibration can be provided in an x direction along the web direction of the surface 44, in a y direction transverse to the web direction of the surface 44, and/or in a z direction orthogonal to the surface 44, or in any combination of two or three of the x, y and z directions.

Alternatively, the levelling force may be provided by a roller or a brush set at a defined height above the surface onto which the ribbons 52 are deposited, the height corresponding to the desired maximum thickness of the layer of ribbons 52, and typically substantially to a ribbon thickness.

In step 20, a resin 56 is coated onto the plurality of ribbons 52 to form the layer 50 of sheet moulding compound. Typically, the plurality of ribbons 52 are scattered onto a layer of the resin which coats the plurality of ribbons 52. The resin 56 may be a thermoplastic resin such as a polyester resin or a polyolefin. More typically, and particularly for forming automotive or vehicle body panels, the resin is a curable thermosetting resin such as an epoxy resin or a vinyl ester resin.

Typically, the plurality of ribbons 52 are scattered onto a bottom layer of resin 47 provided on the web 45 from a resin coater 49 which then at least partially coats the ribbons 52 after scattering of the ribbons 52 thereon. In addition, preferably after scattering of the ribbons, a top layer 51 of resin is applied over the plurality of ribbons 52 scattered onto the surface, the top layer of resin at least partially coating the ribbons 52.

During or after the resin coating of the resin, a flexible covering web 57, for example composed of a polymer similar that employed for the carrier web 45, is applied over the resin coated ribbons 52. The covering web 57 may be pre-coated with the resin layer 51 applied by a resin coater 61 to form the top layer of resin.

Thereafter, the plurality of ribbons 52 are impregnated by the coating resin in an impregnating step 21 carried out by an impregnation station 63, which typically comprises a series of S-wrap rollers 65.

In some preferred embodiments, the impregnating step 21 causes lateral movement in the plane of the SMC layer of at least some ribbons 52 thereby to reduce ribbon overlap and increase the area covered by the ribbons 52, relative to the plane of the SMC layer, and also reduce the thickness of the SMC layer 50. Thus in some embodiments, each layer of sheet moulding compound has been formed by (A) scattering a plurality of the ribbons either (i) onto a surface which is then coated with a resin layer or (ii) onto a resin layer, in each case to form a layer of the plurality of ribbons which are randomly distributed across the plane of the resin layer with there being gaps between adjacent ribbons and wherein at least some of the ribbons mutually overlap, the gaps optionally defining at least 10% of the area of the resin layer, and (B) impregnating the ribbons by the resin, the impregnation causing lateral movement of at least some of the plurality of ribbons in the plane of the resin layer to reduce ribbon overlap, and to reduce the area of the gaps. Typically, after the scattering step (A) the plurality of the ribbons are distributed to cover from 70 to 90% of the layer area, and the subsequent impregnating step (B) causes lateral movement of the ribbons to increase the coverage of the plurality of ribbons over the layer area, optionally to provide that in each layer of sheet moulding compound the ribbons are distributed to cover from 90 to 99% of the layer area, relative to the plane of the layer.

The resin and ribbons are sandwiched between the carrier and covering webs 45, 57 in the impregnating step 21. Typically, a web 67 of the sheet moulding compound is wound up into a roll 69.

Each layer 50 of sheet moulding compound may then optionally be cut to a desired shape and dimensions in step 22.

Figure 4:
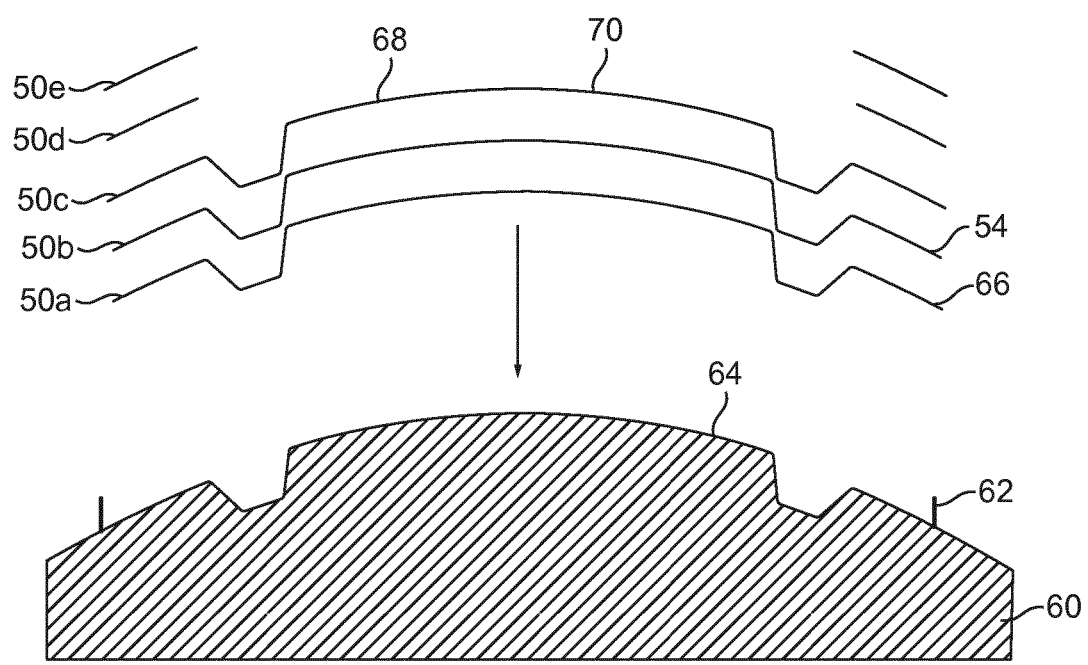
FIG. 4 schematically illustrates a stack of layers of sheet moulding compound in a moulding area of a mould tool in the method illustrated in FIG. 1.

As shown in FIG. 4, in a subsequent step 24, the plurality of layers 50 are assembled as a stack 54 which for clarity is shown in exploded form. Preferably, from 2 to 24 or 2 to 20 layers 50 of sheet moulding compound are provided in the stack 54. In the illustrated embodiment, there are three layers 50a, 50b, 50c extending over the entire moulding area and intended to form a panel part to mould the final panel portion, and two areas where a pair of smaller area reinforcement layers 50d, 50e are provided to provide localised reinforcement to the panel portion.

Typically, the plurality of layers 50 are laminated together under applied pressure and/or heat to form the stack 54. In some embodiments, the plurality of layers 50 are laminated together to form a three-dimensionally shaped preform which retains its shape prior to loading into a mould tool.

Figure 7:
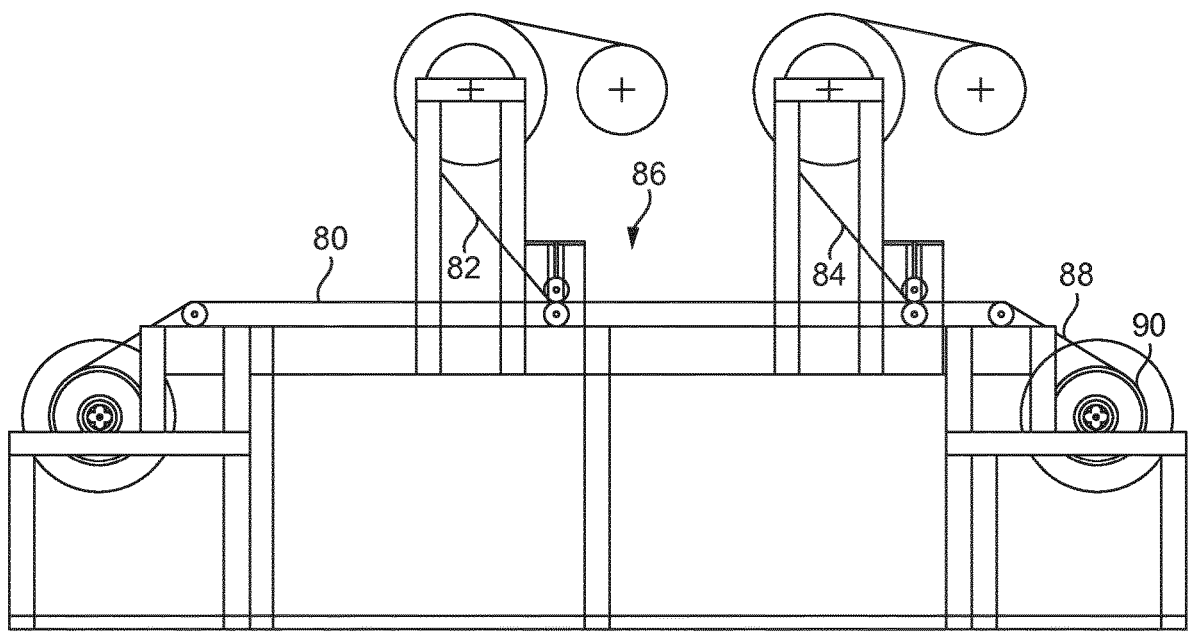
FIG. 7 is an offline stack manufacturing apparatus.

In FIG. 4 the layers 50 are individually assembled in the moulding area. Alternatively, as shown in FIG. 7, plural SMC layers 80, 82, 84 may be assembled together off-line by a roller assembly 86 to provide a web 88 of a stack of a plurality of SMC layers which may be wound up on a roll 90.

The stack 54, which may be in the form of a preform as described above, is located in the moulding area of the mould tool.

In one embodiment, as illustrated in FIGS. 1 and 4, the step 24 of assembling the plurality of layers 50 as a stack 54 is carried out during a locating step in which the stack 54 is located in the moulding area, and the stack is assembled within the moulding area of the mould tool. In an alternative embodiment, the step of assembling the plurality of layers 50 as a stack 54 is carried out prior to the step of locating the stack in the moulding area of the mould tool.

As shown in FIG. 4, the mould tool 60 defines a peripheral edge 62 of the moulding area 64. The stack 54 of layers 50 is shaped and dimensioned to cover from 90 to 100% of the moulding area 64, typically from 95 to 100% of the moulding area 64. A peripheral edge 66 of the stack 54 is located at or inwardly of the peripheral edge 62 of the moulding area 64. The stack 54 of layers 50 defines a panel part 68 having a height of from 0.5 to 1.5 mm.

Thereafter, in step 26 a moulding pressure is applied to an upper surface 70 of the stack 54. This moulding pressure causes the resin to consolidate the stack 54, as known to those skilled in the art. The moulding pressure may be applied by (not shown) an upper mould part of the mould tool or by atmospheric pressure in a vacuum moulding process, both of which processes are known to those skilled in the art.

Figure 6:
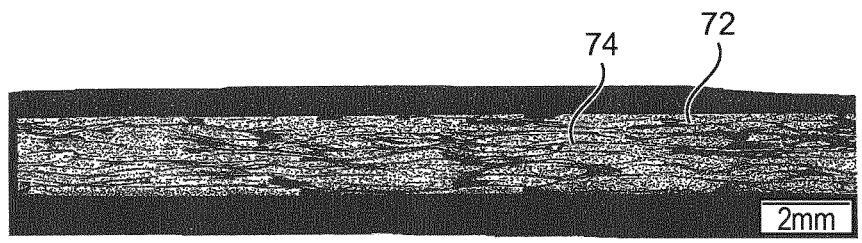
FIG. 6 is a micrograph of a cross-section through a panel produced by a moulding method in accordance with an embodiment of the present invention.

In step 28, when the resin is a thermosetting resin, the resin is substantially fully cured to form a moulded part 72 from the moulding material, shown in FIG. 6. In this specification, the term "substantially fully cured resin" means that the residual enthalpy of the cured resin is less than 15% of the initial heat of polymerisation, as measured by differential scanning calorimetry (DSC), of the uncured resin in the moulding material.

The resin in the moulding material is typically a curable thermosetting resin, such as an epoxy resin, and is preferably selected to have a composition to provide, when cured, a high glass transition temperature Tg, for example a Tg of at least 150° C. This high temperature is selected so that the cured moulded part can be subjected to elevated temperatures, for example by passing a moulded automotive body panel down a high temperature automotive body paint line, without degradation or warping of the panel.

A thermosetting resin, such as an epoxy resin, which is thermally stable at 150° C. has a high cross link density, and correspondingly tends to exhibit a highly exothermic cure. Accordingly, the structure of the panel is adapted to resist degradation or warping of the part during the exothermic cure.

The moulded part 72 includes a panel portion 74 formed from the panel part 68 and having a thickness of from 0.5 to 1.5 mm, typically from 0.7 to 1.4 mm, more typically from 0.8 to 1.2 mm.

In the panel portion 74, the ribbons 52 typically have an average cured ply thickness of from 0.04 to 0.3 mm, optionally from 0.05 to 0.3 mm, further optionally from 0.1 to 0.3 mm. The panel portion has from 6 to 24, or 6 to 20, optionally from 12 to 24 or 12 to 18, mutually stacked ribbons 52 per mm thickness of the panel portion 74. Typically, the panel portion 74 has, per 625 mm$^2$ of the panel portion area, from 50 to 2000, optionally from 200 to 2000, further optionally from 300 to 1800, mutually stacked ribbons 52 per mm thickness of the panel portion 74.

The ribbons 52 in each layer 50 of sheet moulding compound are randomly oriented relative to the ribbons 52 in each other layer 50 of sheet moulding compound and therefore the panel portion 74 has an isotropic or quasi-isotropic carbon fibre orientation in the plane of the panel portion 74.

The SMC stack is provided with a thickness that is close to, i.e. slightly greater than, for example from 0 to 20%, preferably from 0 to 10% greater than, the thickness of the panel portion of the final moulded part. Correspondingly, the area of the SMC stack has a moulding area coverage of at least 90%, preferably at least 95%, relative to the area of the moulding cavity into which the SMC stack is loaded prior to moulding. Preferably, the maximum flow length distance from the peripheral edge of the stack to the peripheral edge of the moulding area is within the range of from 0 to 25 mm, preferably from 0 to 10 mm. Preferably, the maximum flow length distance from the peripheral edge of the stack to the peripheral edge of the moulding area no more than 4L, typically no more than 2L, where L is the average carbon fibre length of the ribbons.

In contrast, in conventional SMC moulding the SMC material, typically provided as a single layer measured dose, has a thickness that is significantly greater than, for example from 30 to 50% greater than, the thickness of the final moulded part and correspondingly, the area of the SMC material has a moulding area coverage of from 50 to 70% relative to the area of the moulding cavity into which the SMC material is loaded prior to moulding. This requires high resin and fibre flow during moulding, which increases localised fibre and resin anisotropy.

In the preferred embodiments of the present invention, by providing that the stack of layers of sheet moulding compound is shaped and dimensioned to cover from 90 to 100%, more preferably from 95 to 100%, of the moulding area and a peripheral edge of the stack is located at or inwardly of the peripheral edge of the moulding area, during the moulding operation the flow of resin and fibres and the filling of the entire moulding cavity by such flow is reduced or minimised as compared to conventional SMC moulding. Accordingly, anisotropy of both fibres and resin, and consequential visual and structural defects, are reduced or minimised as compared to conventional SMC moulding.

In addition, by providing a ribbon structure for the carbon fibres, a random distribution of such ribbons within an SMC layer, and a stack of the SMC layers in the preform prior to moulding under pressure, low pressure consolidation of the preform, and low pressure moulding, can be achieved. The moulding pressure can be significantly lower as compared to conventional SMC moulding, and also as compared to the used of non-woven fabrics in prepregs for making similar moulded parts. Furthermore, the preform structure permits some localised resin and fibre flow around individual features, which can be employed to integrate additional reinforcement layers, or "pad-ups", and to encapsulate fixings.

In conventional SMC moulding, any carbon fibres are typically chopped fibre tows of 25 to 50 mm length with each chopped fibre tow comprising from 12k to 48k carbon fibres. When the carbon fibres are compressed during moulding, a coarse and gap-filled surface and microstructure is formed. Macroscopically, the fibres are randomly oriented, but there is a high degree of local anisotropy particularly in thinner laminates.

The SMC layers used in the present invention are thin and flexible and therefore have very high drape properties. The layers of ribbons provide a uniform and densely nested carbon fibre structure which has low loft and can be moulded using low compressive moulding forces. Splitting of the ribbons lengthwise into narrower ribbons can provide an increased nesting; however, if the ribbons are too narrow, so as effectively to break a ribbon into individual carbon fibres, the carbon fibres do not readily nest and there is excessive loft. The layers can readily be laid up individually onto a mould surface, which may be a preform mould, having three-dimensional shaping and profiling, to form a three-dimensionally shaped stack. Additional reinforcement layers can be added to provide localised increases in thickness in the stack and the resultant moulded part.

The moulded part incorporates a panel portion produced from the stack which has a thickness, excluding any localised reinforcement and prior to application of any surface resin layer or paint, of from 0.5 to 1.5 mm, typically from 0.7 to 1.4 mm, more typically from 0.8 to 1.2 mm.

The moulded panel portion has a random distribution of randomly oriented carbon fibre ribbons. This random distribution of randomly oriented carbon fibre ribbons is present not only in each layer in the panel portion resulting from a precedent SMC layer, but also throughout the thickness of the panel portion since the ribbons in each layer are randomly arranged relative to the ribbons in each other layer.

Although each ribbon comprises aligned carbon fibres, in the moulded panel portion there is reduced overall and localised anisotropy with regard to fibre orientation and distribution as compared to some SMC conventionally moulded products, particularly for large surface area panel products.

The reduced fibre and resin anisotropy reduces or avoids distortion or warping of the moulded part, particularly when the moulded part is a panel portion, most typically with a large surface area, for example greater than 1 m². In order to provide enhanced reduction of localised fibre anisotropy throughout the panel portion, typically the fibre length in the ribbons is selected to be sufficiently low so that there is a high number of randomly oriented carbon fibre ribbons for a given surface area of the panel portion. For example, typically the carbon fibre length, and correspondingly the ribbon length, is the ribbons from 3 to 25 mm, preferably from 3 to 18 mm, further preferably from 5 to 13 mm. A particularly preferred carbon fibre length is from 6 to 12 mm. If the carbon fibre length is too low, for example below 3 mm, then fibre flow may increase to cause an undesired increase in anisotropy, and also the fibres may present a greater resistance to a compressive moulding force, requiring higher moulding pressures. Furthermore, low fibre lengths may introduce a difficulty in obtaining a high fibre volume fraction, which is required to provide high mechanical properties, such as high stiffness, high tensile strength and low coefficient of thermal expansion, in carbons fibre panels, particularly having low thickness and large surface area. Low fibre lengths can reduce stiffness, strength, and impact performance.

Furthermore, typically the ribbon width is selected to be sufficiently low so that there is a high number of randomly oriented carbon fibre ribbons for a given surface area of the panel portion. Typically, the ribbons have a width, measured transverse to the mutually aligned fibres, of from 1 to 32 mm, optionally from 1 to 16 mm, further optionally from 1 to 8 mm, yet further optionally from 1 to 4 mm. as described above, the ribbon may have been formed by splitting lengthwise larger width ribbons to increase the number of ribbons per unit area and increase the isotropy of the ribbon distribution in the direction of the plane of the panel portion and through the thickness of the panel portion.

Typically, the ribbons have a carbon fibre weight per unit area, the area of the ribbon being measured in the plane of the layer of SMC material, of from 30 to 200 g/m², optionally from 50 to 200 g/m², or optionally from 30 to 100 g/m², yet further optionally from 50 to 100 g/m² or from 40 to 70 g/m².

Typically, the layer of SMC material has a carbon fibre weight per unit area, the area of the layer of SMC material being measured in the plane of the layer of SMC material, of from 100 to 600 g/m², typically from 100 to 400 g/m², optionally from 150 to 300 g/m², or 200 to 400 g/m².

The ribbons typically have an average thickness of from 0.04 to 0.3 mm, optionally from 0.05 to 0.3 mm, further optionally from 0.04 or 0.05 to 0.12 mm.

In the cured product, the ribbons typically have an average thickness of from 0.04 to 0.12 mm.

Typically in the cured product, there are greater than 10 ribbons per mm thickness of the cured product, preferably from 10 to 24 or 12 to 20 ribbons per mm thickness of the cured product.

As described herein, the ribbons preferably have a carbon fibre weight per unit area, the area of the ribbon being measured in the plane of the ribbon, of from 30 to 200 g/m², from 30 to 100 g/m², from 50 to 100 g/m² or from 40 to 70 g/m². In combination with any of these values of carbon fibre weight per unit area, the ribbons preferably also have an average cured ply thickness of ply thickness of from 0.04 to 0.3 mm, from 0.04 to 0.12 mm, from 0.04 to 0.10 mm, from 0.04 to 0.08 mm, from 0.05 to 0.3 mm, from 0.05 to 0.12 mm, from 0.05 to 0.10 mm, or from 0.05 to 0.08 mm. In combination with any of these values of carbon fibre weight per unit area and/or in combination with any of these values of the average cured ply thickness of the ribbons, the panel portion preferably has from 2 to 24, from 6 to 20, from 6 to 24, from 12 to 18, from 12 to 20, or from 12 to 24 mutually stacked ribbons per mm thickness of the panel portion. In combination with any of these parameters for the ribbons, in any combination thereof, the layer of sheet moulding compound has a carbon fibre areal weight of from 100 to 600 g/m², from 100 to 400 g/m², from 150 to 400 g/m² or from 150 to 300 g/m², from 200 to 600 g/m², or from 200 to 400 g/m². In combination with any of these parameters for the ribbons, in any combination thereof, and for the layer of sheet moulding compound, in any combination thereof, the panel portion preferably has a carbon fibre areal weight of from 500 to 1500 g/m² or from 500 to 1400 g/m² and/or the panel portion preferably has, for either areal weight range, a thickness of from 0.5 to 1.5 mm, from 0.7 to 1.4 mm or from 0.8 to 1.2 mm.

By providing very thin, typically flattened, ribbons in the layer of SMC material, a multilayer carbon fibre ribbon structure is present in the moulded panel portion even though the panel portion is very thin, as described above, typically up to 1.5 mm or up to 1.2 mm. Typically, from 2 to 24 or 2 to 20 layers of sheet moulding compound are provided in the stack, which can provide that the panel portion has from 6 to 24 or 6 to 20, optionally from 12 to 18 or 12 to 20, mutually stacked ribbons per mm thickness of the panel portion. In addition, typically the panel portion has, per 625 mm² of the panel portion area, from 50 to 2000, optionally from 200 to 2000, further optionally from 300 to 1800, mutually stacked ribbons per mm thickness of the panel portion.

Such a multilayer construction for the SMC stack and consequently the panel portion provides that the panel portion has a high degree of fibre isotropy.

Typical conventional SMC and carbon SMC (CSMC) moulding materials are provided into a mould cavity as a thick body, comprised of a single layer of moulding material, that covers only a small proportion of the mould area, and then upon moulding the moulding material is significantly compressed in thickness so as to flow and fill the volume of the moulding cavity. In contrast, in accordance with the present invention, the moulding material comprises as plurality of stacked thin layers of moulding material which cover a substantial proportion of the mould area, so that the moulding material is a "near net shape" of the final moulded part, in which the stack covers at least 90%, typically at least 95%, of the mould area. The thickness of the stack is substantially the same as, or slightly greater than, the thickness of the final moulded part. Upon moulding, the moulding material is slightly compressed in thickness and there is little resin flow outwardly to the periphery of the moulding cavity. Typically, the maximum dimension of resin flow is 20 mm, more typically 10 mm, within the moulding cavity from an edge of the stack to the peripheral edge of the moulding cavity.

The lightweight carbon fibre panel typically has a carbon fibre areal content of from 500 to 1500 g/m² or from 500 to 1400 g/m² and a thickness of from 0.7 to 1.5 mm. The carbon fibre typically has a volume fraction (Vf) of 40 to 50% in the panel. Carbon fibre SMC moulding compositions are currently not commercially used to produce carbon fibre panels as the current SMC moulding process produces components with a carbon fibre content of greater than 1600 g/m² and a thickness of from at least 1.7 mm.

Figure 5:
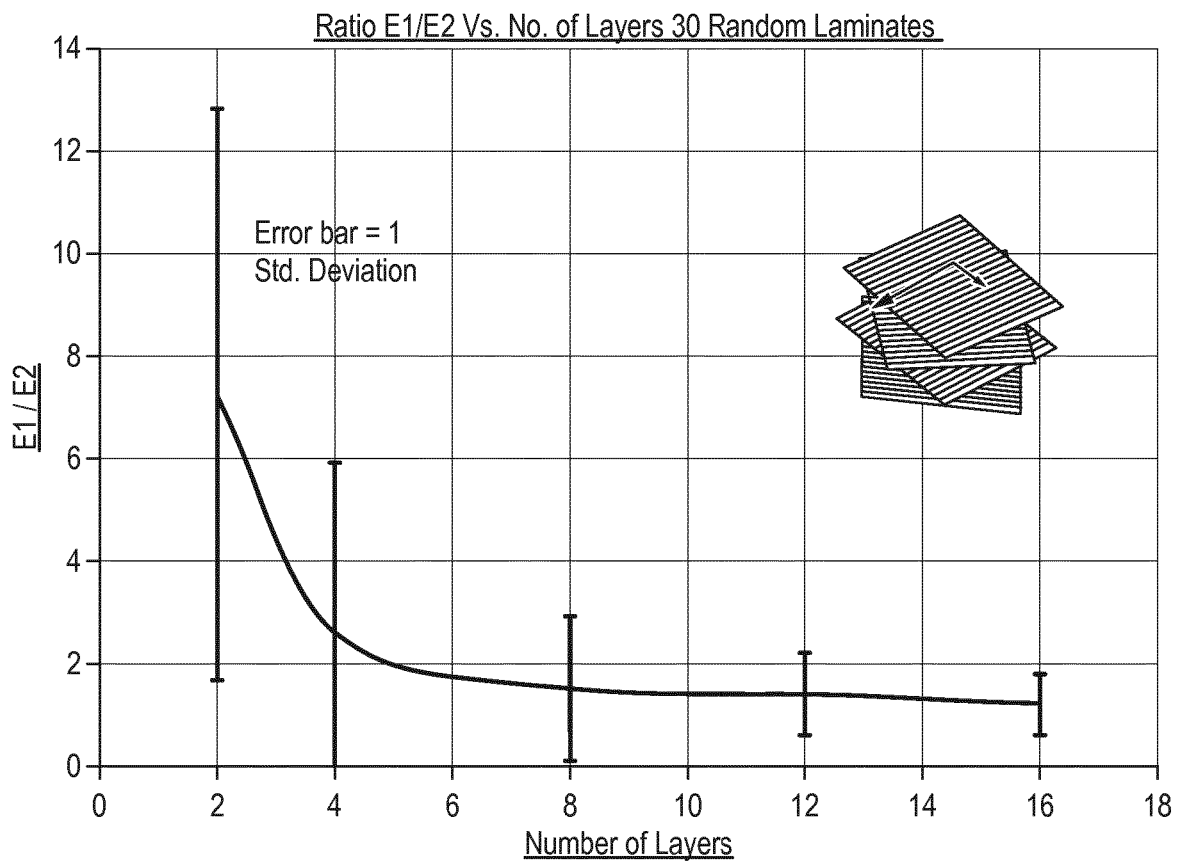
FIG. 5 is a graph which shows the relationship between the ratio E1/E2 and the number of layers, or SMC plies, in the thickness of a carbon fibre laminate panel.

Referring to FIG. 5, a calculation was made to determine the number of SMC plies of the final panel thickness required to achieve anisotropy with regard to mechanical properties, in particular the tensile, i.e. Young's, modulus E. Using classical laminate theory, the ratio between E1 and E2 in two orthogonal directions in the plane of the laminate was calculated relative to the number of randomly oriented plies in the laminate. A random fibre angle was generated between 0 and 180° for each ply in the laminate. For each laminate, axis 1 was taken as the average fibre angle of the stack, and axis 2 was perpendicular thereto. To simulate, and compare, 30 areas within the carbon fibre panel, 30 separate laminates were considered. The angle of each ply within each laminate was randomly generated. The ratio E1/E2 was calculated assuming each ply was a unidirectional carbon fibre laminate at an angle θ where θ was the angle of each ply relative to axis 1. The result of these calculations is shown in FIG. 5 which shows the relationship between the ratio E1/E2 and the number of layers, or SMC ribbons, in the thickness of the laminate.

FIG. 5 shows that to substantially achieve isotropy for the tensile modulus inn the panel, which is achieved when the ratio E1/E2 is approximately 1 (i.e. unity), the number of layers should be at least 6, and preferably greater than 8, more preferably greater than 10, through the panel thickness. When the number of layers is less than 4, there is a high degree of anisotropy between the tensile modulus values E1 and E2 and the ratio E1/E2 is higher than 2, and also there is a large standard deviation which would further tend to increase anisotropy and tensile properties from location to location over the panel area. For thin laminates of 1 mm or less, the ribbons should be thin, and typically have been subjected to a fibre-spreading or flattening process as described herein, to provide sufficiently thin ribbons and SMC layers so that at least 6, preferably 8, more preferably greater than 10, plies of ribbons and SMC layers are stacked to provide substantially isotropic mechanical properties, particularly tensile modulus, in the carbon fibre panel portion.

The thinner and spread/flattened ribbons also reduce fibre print-through into the moulded panel surface since the resin pockets formed as the fibres cross over each other are reduced.

In the preferred embodiment, the method forms a vehicle body panel 76 of fibre-reinforced resin matrix composite material. The vehicle body panel 76 may have a front A-surface 78 and a rear B-surface 80. The panel portion 74 is an engineered structure which is configured to achieve low weight and low thickness and to avoid thermal warping as the panel portion 74 cools down from the moulding temperature.

As described above, a surface of the panel portion may be coated with a surface resin layer. Such a surface resin layer typically comprises a thermosetting resin, such as an epoxy resin, which is thermally stable at 150° C. The surface resin layer functions to permit the resultant cured and moulded surface to accept a later-applied paint primer and to buffer against deformation (known in the art as "print-through") of the moulded surface by the uppermost fibre layers. Such print-through may be generated by uppermost layers of high modulus and/or high fibre thickness, and is particularly prevalent when carbon fibres are employed at the surface of the moulded part. The thermosetting resin may include a filler such as talc. The talc filler provides the cured surface layer with an abradability so that the surface can be easily abraded, in order to provide a desired finish to the surface or to repair the surface. The talc filler also reduces the coefficient of thermal expansion of the surface resin layer and increases the tensile modulus of the surface resin layer.

In this embodiment, a carbon fibre surface, in the form of the random distribution of ribbons 52, is located toward the exposed surface of the panel portion 74 to be moulded from the SMC moulding material, for example the surface of an automotive body panel. The carbon fibre layer of stacked ribbons is a structural layer to provide stiffness to the moulded part, such as a panel. The carbon fibre layer is selected to provide the desired mechanical properties to the resultant moulded part. For example, when the moulded part is intended to be an automotive body panel, the fibre layer has a low coefficient of thermal expansion and high tensile modulus.

Such a fibre/resin structure provides panel stiffness and assists, by providing a uniform isotropic structure, in achieving a balance of the thermal expansion of the various layers on opposite sides of the central neutral axis of the panel portion 74, so that the entire panel portion 74 tends not to warp during manufacture or use. The carbon fibre exhibits a low coefficient of thermal expansion and a high tensile modulus, such as Young's modulus. Any surface resin layer is selected to match the thermal expansion coefficient of the panel portion 74.

One or more further fibre layers, together with any necessary associated resin, either as prepreg or SMC layers, may optionally be located remote from the exposed surface of the SMC moulding material. This may provide one or more further structural layers to provide stiffness to the moulded part, such as a panel. Typically, the further fibre layer or layers may comprise carbon or glass fibres, woven into a fabric. The further fibre layers may attach a fitment for the panel The SMC carbon fibre layers provide good thermal balance to the entire laminate of moulding material during the moulding process. In FIG. 4 the moulding surface of the mould tool is shown as being planar for clarity of illustration. However, in nearly every embodiment of the present invention the moulding and moulded surfaces have a three dimensional shape and configuration, for example as present in a vehicle body panel.

Optionally, a reduced pressure may be applied to the mould cavity to vacuum form the SMC moulding material instead of first forming a shaped preform. The drape can occur at least partly under the action of gravity. The drape increases as the material softens from the heat of the mould. The draping at least partly under the action of gravity within the mould configures at least part of the draped moulding material in a partly moulded shape. The moulding material typically drapes by bending about a neutral axis substantially centrally located with respect to the thickness of the moulding material.

During moulding within a closed cavity press mould, preliminary air evacuation from the mould cavity may be used to prevent the risk of any air being inadvertently trapped at the upper and lower surface of the moulding material which would otherwise generate surface defects. As the upper mould part is lowered, under a preset vacuum pressure within the mould cavity, to come into contact with the moulding material, the upper surface of the moulding material contacts the heated upper mould part. Consequently, the surface resin of the moulding material softens, melts, and begins to cure, very rapidly at the immediate surface and slower with a heat lag deeper into the bulk of the thickness of the moulding material. The cure onset of the surface resin in contact with the heated upper mould part generates a beneficial resin-rich layer at the front A-surface, which in turn produces highly desirable, high cosmetic surface quality carbon fibre panels with visible carbon fibres but a protective resin finish which reduces later read-through, or print-through, of the underlying carbon fibres.

This resin layer can then produce an aesthetic effect where the carbon ribbons exhibit an attractive visible appearance but the outer surface remains smooth during its in-service life.

The preferred embodiments of the present invention can provide the moulding of an SMC multilayer moulding material which can deliver consistent moulded composite parts. This moulding material can enable net shape parts to be manufactured, thereby requiring less finishing work and permitting the use of simpler, and lower cost, press and tooling designs.

In some embodiments of the present invention, a random carbon fibre moulding material can be made using the following steps:

1. A carbon fibre tow, typically a 12K carbon fibre tow, is fed from a bobbin of carbon fibre into a spreader so that that the carbon fibre is spread into a ribbon. The carbon fibre tow has a typical weight of 150 $g/m^2$ and a typical thickness of about 6 mm. The ribbon typically has a width of from 11 to 28 mm and a weight of from 30 to 70 $g/m^2$, preferably from 40 to 50 $g/m^2$. Alternatively, a 24K carbon fibre tow, which has a typical weight of 240 $g/m^2$ and a typical thickness of about 12 mm, is spread into a ribbon which is split into two equal weight ribbons, each of which has 12K carbon fibres and each typically has a width of from 11 to 28 mm and a weight of from 30 to 70 $g/m^2$, preferably from 40 to 50 $g/m^2$. Alternatively, a 48K carbon fibre tow, is similarly spread into a ribbon which is split into four equal weight ribbons, each of which has 12K carbon fibres and each typically has a width of from 11 to 28 mm and a weight of from 30 to 70 $g/m^2$, preferably from 40 to 50 $g/m^2$. A 60K carbon fibre tow may be similarly processed into five equal weight ribbons, each of which has 12K carbon fibres and each typically has a width of from 11 to 28 mm and a weight of from 30 to 70 $g/m^2$, preferably from 40 to 50 $g/m^2$.
2. The ribbon is stabilised by coating with a size or resin, and then by drying. The size or resin may be in an aqueous solution. The resin may be cured, for example by irradiation by infrared radiation. Alternatively, the ribbon is stabilised by coating with a thermoplastic melt, which is then cooled and solidified.
3. The stabilised dry ribbon is then fed to a rotary chopper to chop the fibre into flattened ribbons (i.e. bundles) with typically 6-24 mm length, for example from 9 to 15 mm length. A mixture of different ribbon lengths may be combined into a single batch of chopped ribbons.
4. The pre-chopped fibre ribbons were dispersed by scattering onto a pre-cast resin film. The resin film typically comprises an epoxy resin. The resin film may further comprise milled carbon fibre or other fillers. Optionally, a second resin layer may be provided over the scattered ribbons. Typically, the resin, in total, is 40 to 65% by weight and more preferably 45 to 55% by weight of the prepreg weight. The resultant assembly of the fibre ribbons on the resin film typically has a fibre areal weight of from 100 to 600 $g/m^2$, for example from 200 to 400 $g/m^2$, of carbon fibre.
5. The resultant assembly of the fibre ribbons on the resin film was heated to at least partly impregnate the carbon fibre with the resin. The heating caused resin flow which tended to cause the ribbons and fibres therein to be redistributed in the plane of the resultant prepreg, which reduced the area and number of gaps between adjacent ribbons and tended to reduce the number and area of overlaps between the ribbons. This formed a random carbon fibre sheet moulding compound (SMC) in the form of a thin prepreg ply having a thickness less than the thickness of the intended final moulded part which is to be produced from a stack of the thin prepreg plies of the random carbon fibre sheet moulding compound (SMC). The ply is provided as a sheet or roll having from 100 to 600 $g/m^2$, for example from 200 to 600 $g/m^2$ or from 200 to 400 $g/m^2$, of carbon fibre.
6. A plurality of the plies are laid up into a mould to make a moulded part. Alternatively, a plurality of the plies are pre-laminated to make a preform which is then laid up into a mould to make a moulded part. The moulding may be by vacuum moulding of by press moulding.

In accordance with some embodiments of the present invention, a scattered plurality of ribbons is provided in or on a resin layer and resin impregnation causes resin flow which further "levels" the prepreg to spread out the gsm variation to form a more uniform layer—more uniform in the evenness of the distribution of the ribbons over the surface area and more uniform in thickness of the prepreg, with reduced ribbon overlap.

For example, scattering of 12K carbon ribbons directly from a fibre chopper onto a 100 $g/m^2$ resin layer to provide a total of 100 $g/m^2$ fibre coverage formed from a random distribution of the 130 $g/m^2$ fibre ribbons which had an average length of 12 mm and an average width of 6.3 mm was found to provide 65% area coverage by the ribbons, and after impregnation the area coverage by the ribbons was found to be 90%. In another example, scattering the same 12K ribbons onto a 200 $g/m^2$ resin layer to provide 200 $g/m^2$ of fibre coverage was found to provide 86% area coverage by the ribbons, and after impregnation the area coverage by the ribbons was found to be 97%. In a further example, scattering of the same ribbons onto a 300 $g/m^2$ resin layer to provide 300 $g/m^2$ of fibre coverage was found to provide 90% area coverage by the ribbons, and after impregnation the area coverage by the ribbons was found to be 98%. In a yet further example, scattering of ribbons onto a 400 $g/m^2$ resin layer to provide 400 $g/m^2$ of fibre coverage was found to provide 93% area coverage by the ribbons, and after impregnation the area coverage by the ribbons was found to be 99%.

It can be seen that at lower fibre and resin coating weights, the impregnation has a proportionally greater effect on increasing the area coverage of the ribbons as a result of the impregnation causing lateral movement of the ribbons.

When plural prepreg layers are stacked, although each individual prepreg layer has less than 100% ribbon coverage, the coverage in the stack is significantly increased by providing the stack.

For example, 2×prepreg layers each containing 100 gsm of fibre and 50% by weight resin stacked on top of each other form a 200 gsm fibre stack, and each prepreg layer may have a ribbon areal coverage of 90%, but when combined in the stack gives 99% ribbon areal coverage which is more effective than providing a single prepreg layer containing 200 gsm of fibre as scattered ribbons and 50% by weight resin.

In another example, 2×200 gsm fibre and 50% resin content layers each initially having 97% ribbon areal coverage provided, in the stack thereof, 99.5% ribbon areal coverage which is very similar coverage to starting with a single 400 gsm fibre and 50% resin content layer but the material appeared flatter when cured with a more level surface.

The present invention will now be illustrated further with reference to the following Examples.

Example 1

This example produced an inner component panel for an automobile.

A random carbon fibre moulding material was made using the following steps:
1. A 12K carbon fibre was fed from a bobbin of carbon fibre into a rotary chopper to chop the fibre into flattened ribbons (i.e. bundles) with 6 mm length and approximately 6.3 mm width. The ribbons of fibre had a 130 g/m$^2$ areal weight, measured with respect to the flattened surface of the ribbon defining the length and width of the ribbon. The chopped carbon fibre ribbons were stored in amounts of 5 Kg in containers.
2. The pre-chopped fibre was dispersed onto a pre-cast resin film of 225 g/m$^2$ areal weight. The resin film comprised epoxy resin and had a curing temperature of 160° C. (Gurit SE160 epoxy prepreg resin system). This dispersing step formed a random fibre distribution over the resin film. The target areal weight for the fibres was 225 g/m$^2$. The working of the chopped ribbons during storage and subsequent dispersion caused the original flattened ribbons of approximately 6.3 mm width to split into a larger number of narrower ribbons of fibre.
3. A 200×200 mm (i.e. 40,000 mm$^2$) area of the resultant assembly of the fibre ribbons on the resin film was tested to measure an average fibre areal coverage of 91% relative to the total area of the sample, an areal weight of 217 g/m$^2$ of fibre and a smaller average split ribbon width of 1.1 mm (as compared to the chopped ribbon width of approximately 6.3 mm).
4. The resultant assembly of the fibre ribbons on the resin film was heated to a temperature of 80° C. and a net pressure of 1 bar was applied to impregnate the carbon fibre with the resin and form a random carbon fibre sheet moulding compound (SMC).

An automotive inner component with a substantially rectangular plan, and plan dimensions of 1210×1130 mm, was produced using the random carbon fibre sheet moulding compound (SMC) using the following steps:
1. Laying over a preform mould a first 1.4×1.25 m sheet of the random carbon fibre sheet moulding compound (SMC).
2. Manually shaping the sheet to form the approximate final shape and dimensions thereby providing the three-dimensional geometrical features and drawing in the excess material from the oversize sheet.
3. Cutting two reinforcement patches from another sheet of the random carbon fibre sheet moulding compound (SMC).
4. Applying the two reinforcement patches at respective appropriate locations on the upper surface of the first sheet to provide additional local strength and stiffness to the resultant inner component.
5. Cutting second and third 1.4×1.25 m sheets of the random carbon fibre sheet moulding compound (SMC).
6. Laying the second and third 1.4×1.25 m sheets sequentially over the sheet/patch assembly.
7. Manually shaping the sheets to form the approximate final shape and dimensions thereby providing the three-dimensional geometrical features and drawing in the excess material from the oversize sheet.
8. Applying a release film to the upper surface of the sheet assembly on the preform mould, which corresponds to the rear surface of the sheet assembly relative to the front surface moulded by the preform mould.
9. Using a vacuum de-bulk step at 20° C. for 10 minutes to form the sheets with the detailed contours of the preform mould, thereby to form a perform.
10. Cutting the perimeter of the preform to the required moulding shape.
11. Cooling the preform to 5° C.
12. Demoulding the preform from the preform mould.
13. Transferring the preform, and its upper release film to a composite mould tool.
14. Applying a breather cloth over the upper surface of the release film and sealing a vacuum bag around the perimeter of the preform.
15. Applying a vacuum between the tool and the vacuum bag to consolidate the stack of layers in the preform.
16. Transferring the vacuum moulding assembly to a hot air oven to cure the epoxy resin using the following cure: 2° C. ramp to 90° C.; dwell time of 15 min; 2° C. ramp to 150° C.; dwell time of 30 min; then cool to room temperature (approximately 20° C.).
17. Demould the moulded part and trim any excess resin flash.

The resultant inner component, despite having an area of more than 1 m$^2$, a total areal weight of 1326 g/m$^2$, a total carbon fibre weight of 651 g/m$^2$ and a panel thickness of 0.9 mm excluding localised reinforcement, was free of warping and distortion. This inner component was made under low pressure, in particular using a vacuum moulding process. The carbon fibre inner component had high moulding quality. The carbon fibre inner component was manufactured from only 5 pieces of high drape random carbon fibre sheet moulding compound material, and only 3 of those pieces provided the primary bulk structural components of the resultant inner component.

Comparative Example 1

An inner component having the same dimensions, and geometry, as the inner component made according to Example 1 was previously made using a vacuum moulding process from 28 separate pieces of SE160 woven carbon fibre prepreg. This required ply-by-ply laminating of many small pieces of woven carbon prepreg. Since the inner component had three-dimensional shaping, the prepreg pieces could not easily be manipulated to form the required three-dimensional profiles without distortion or creasing, and so very many individual pieces had to be assembled together in a complicated design to provide a coherent mouldable structure. The inner was free of distortion and the required geometry and finish.

However, in contrast Example 1, which used highly drapeable thin SMC layers, made a similar product which was the same weight but made more quickly and cheaply because of the significantly fewer pieces of lower cost material that required to be laid up to form the preform.

Example 2

This example produced an inner component panel for an automobile.

A 150 g/m² random carbon fibre moulding material was made using the following steps:
1. A 12K carbon fibre was fed from a bobbin of carbon fibre into a rotary chopper to chop the fibre into flattened ribbons (i.e. bundles) with 6 mm length and approximately 6.3 mm width. The ribbons of fibre had a 130 g/m² areal weight, measured with respect to the flattened surface of the ribbon defining the length and width of the ribbon. The chopped carbon fibre ribbons were stored in amounts of 5 Kg in containers.
2. The pre-chopped fibre was dispersed onto a pre-cast resin film of 150 g/m² areal weight. The resin film comprised epoxy resin and had a curing temperature of 160° C. (Gurit SE160 epoxy prepreg resin system). This dispersing step formed a random fibre distribution over the resin film. The target areal weight for the fibres was 150 g/m². The working of the chopped ribbons during storage and subsequent dispersion caused the original flattened ribbons of approximately 6.3 mm width to split into a larger number of narrower ribbons of fibre.
3. A 200×200 mm (i.e. 40,000 mm²) area of the resultant assembly of the fibre ribbons on the resin film was tested to measure an average fibre areal coverage of 82% relative to the total area of the fibres on the resin film, an areal weight of 150 g/m² of fibre and a smaller average split ribbon width of 1.1 mm (as compared to the chopped ribbon width of approximately 6.3 mm).
4. The resultant assembly of the fibre ribbons on the resin film was heated to a temperature of 30° C. and a net pressure of 1 bar was applied to partly impregnate the carbon fibre with the resin and form a 150 g/m² random carbon fibre sheet moulding compound (SMC).

A 300 g/m² random carbon fibre moulding material was made using the following steps:
1. A 12K carbon fibre was fed from a bobbin of carbon fibre into a rotary chopper to chop the fibre into flattened ribbons (i.e. bundles) with 6 mm length and approximately 6.3 mm width. The ribbons of fibre had a 130 g/m² areal weight, measured with respect to the flattened surface of the ribbon defining the length and width of the ribbon. The chopped carbon fibre ribbons were stored in amounts of 5 Kg in containers.
2. The pre-chopped fibre was dispersed onto a pre-cast resin film of 300 g/m² areal weight. The resin film comprised epoxy resin and had a curing temperature of 160° C. (Gurit SE160 epoxy prepreg resin system). This dispersing step formed a random fibre distribution over the resin film. The target areal weight for the fibres was 300 g/m². The working of the chopped ribbons during storage and subsequent dispersion caused the original flattened ribbons of approximately 6.3 mm width to split into a larger number of narrower ribbons of fibre.
3. A 200×200 mm (i.e. 40,000 mm²) area of the resultant assembly of the fibre ribbons on the resin film was tested to measure an average fibre areal coverage of 98% relative to the total area of the fibres on the resin film, an areal weight of 300 g/m² of fibre and a smaller average split ribbon width of 1.1 mm (as compared to the chopped ribbon width of approximately 6.3 mm).
4. The resultant assembly of the fibre ribbons on the resin film was heated to a temperature of 30° C. and a net pressure of 1 bar was applied to partly impregnate the carbon fibre with the resin and form a 300 g/m² random carbon fibre sheet moulding compound (SMC).

An automotive inner component with a substantially rectangular plan, and plan dimensions of 1510 mm×1320 mm, was produced using the random carbon fibre sheet moulding compound (SMC) using the following steps:
1. Manually forming a layer of the 150 g/m² random carbon fibre sheet moulding compound (SMC) over a preform tool surface.
2. Manually forming a second and third layer of the 300 g/m² random carbon fibre sheet moulding compound (SMC) over the first layer on preform tool surface to form a 3 ply thick panel region with a target thickness of 1.0 mm over substantially all of the part surface.
3. Using offcut materials from the 150 g/m² or 300 g/m² random carbon fibre sheet moulding compound (SMC) to form reinforcement patches which were placed on top of the third layer to provide localised strength and stiffness at various desired positions to form reinforced regions having approximate target thickness of 2.0 mm, 3.0 mm and 3.7 mm.
4. Applying a release film to the upper surface of the sheet assembly on the preform mould, which corresponds to the rear surface of the sheet assembly relative to the front surface moulded by the preform mould.
5. Vacuum consolidating the preform stack for 20 minutes at 20° C.
6. Cutting the perimeter of the preform to the required shape and dimensions.
7. Cooling the preform to 5° C. to assist demoulding from the preform tool.
8. Transferring the preform to a press mould having a mould tool heated to an isothermal temperature of 150° C. The preform had been cut as in step 6 to provide preform shape and dimensions so that when inserted into the mould tool, the preform covered 95% of the moulding area of the mould tool, with the peripheral edge of the preform located at or slightly inwardly of the perimeter of the moulding cavity of the mould tool.
9. Closing the press and applying vacuum before the upper mould tool contacted the preform.
10. Ramping the load of the press to an equivalent pressure of 8 bar within 90 seconds of the preform first contacting the mould tool.
11. Curing at for 15 minutes before demoulding the moulded part while still hot and then transferring the moulded part to a resting jig at room temperature (approximately 20° C.).

The resultant cured automotive inner component despite having an area of more than 1 m², a total areal weight of 1500 g/m², a total carbon fibre weight of 750 g/m² and a panel thickness of 1.0 mm excluding localised reinforcement, was the correct shape and dimensions and was free of warping and distortion. The SMC material had flowed to fully reinforce the thicker reinforcement areas defined by the mould cavity. The SMC material had flowed to the mould perimeter, and then clogged the split line between the upper and lower mould tool parts, the clogging preventing excessive resin flash normally seen when manufacturing the equivalent part from woven prepregs.

Example 3

FIG. 6 is a micrograph of a cross-section through a panel portion produced in accordance with an embodiment of the present invention. It may be seen that multiple layers of ribbons of carbon fibres are provided through the thickness of the panel portion. The ribbons remain as stacked layers in the panel portion and the resin is uniformly distributed to form a single resin matrix throughout the thickness of the panel portion.

In this example the ribbons comprised fibres 6 mm in length and contained 12k carbon fibres per ribbon. The ribbons had been evenly dispersed in each SMC layer. There was an average of 13.4 ribbons throughout the thickness of the panel portion. The panel portion had an average thickness of 1.994 mm, thereby providing an average of 6.9 fibre ribbons per mm of the thickness of the panel portion. The fibre ribbons formed a highly ordered and regular laminar structure, with a high degree of mechanical isotropy.

Various modifications to the illustrated embodiments of the invention will be readily apparent to those skilled in the art.

The invention claimed is:

1. A method of moulding a moulding material to form a moulded part of fibre-reinforced resin matrix composite material, the method comprising the steps of:
   i. providing a plurality of layers of sheet moulding compound, each layer comprising a plurality of ribbons randomly distributed across the plane of the respective layer and at least partly coated by a resin, each ribbon comprising a bundle of mutually aligned carbon fibres and being randomly oriented within the plane of the layer, in each layer of sheet moulding compound the ribbons are distributed to cover less than 100% of the plane of the layer, wherein each layer of sheet moulding compound is formed by the following steps: (a) providing an elongate tow of carbon fibres; (b) spreading the tow of carbon fibres to form an elongate ribbon; and (c) cutting the elongate ribbon transverse to the length of the elongate ribbon to form a plurality of individual ribbons; (d) scattering the plurality of ribbons onto a surface to form a layer of the plurality of ribbons which are randomly distributed across the plane of the layer; and (e) coating a resin onto the plurality of ribbons to form the layer of sheet moulding compound, wherein in step (a) the elongate tow of carbon fibres comprises carbon fibres coated with a resin size composition and step (b) comprises the sub-steps of (b1) heating the elongate tow of carbon fibres to soften the resin size composition, wherein in step (b1) the elongate tow of carbon fibres is heated by electromagnetic radiation; (b2) spreading the heated tow of carbon fibres to form the elongate ribbon while the resin size composition is in a softened state; and (b3) cooling the elongate ribbon to harden the resin size composition;
   ii. assembling the plurality of layers as a stack;
   iii. locating the stack in a moulding area of a mould tool, the mould tool defining a peripheral edge of the moulding area, wherein the stack of layers is shaped and dimensioned to cover from 90 to 100% of the moulding area and a peripheral edge of the stack is located at or inwardly of the peripheral edge of the moulding area, the stack of layers defining a panel part;
   iv. applying a moulding pressure to an upper surface of the stack and causing the sheet moulding compound to flow and fill a mould cavity, defined by the moulding area, of the mould tool; and
   v. solidifying the resin to form a moulded part from the moulding material, wherein the moulded part includes a panel portion formed from the panel part.

2. A method according to claim 1 wherein in step ii the stack of layers defining the panel part has a height of from 0.5 to 1.5 mm and/or in step iv the panel portion formed from the panel part has a thickness of from 0.5 to 1.5 mm, from 0.7 to 1.4 mm or from 0.8 to 1.2 mm.

3. A method according to claim 1 wherein step ii of assembling the plurality of layers as a stack is carried out during step iii and within the moulding area of the mould tool.

4. A method according to claim 1 wherein step ii of assembling the plurality of layers as a stack is carried out prior to step iii of locating in the moulding area of the mould tool, in step ii of the plurality of layers are laminated together under applied pressure and/or heat to form the stack, and in step ii of the plurality of layers are laminated together to form a three-dimensionally shaped preform that is then in step iii located in the moulding area of the mould tool.

5. A method according to claim 1 wherein the ribbons have a carbon fibre weight per unit area, the area of the ribbon being measured in the plane of the layer, of from 30 to 200 g/m$^2$, from 30 to 100 g/m$^2$, from 50 to 100 g/m$^2$ or from 40 to 70 g/m$^2$.

6. A method according to claim 1 wherein the ribbons have a length, measured along the mutually aligned fibres, of from 3 to 25 mm, from 3 to 18 mm or from 5 to 13 mm and/or wherein the ribbons have a width, measured transverse to the mutually aligned fibres, of from 1 to 32 mm, from 1 to 20 mm, from 1 to 16 mm, from 1 to 8 mm or from 1 to 4 mm.

7. A method according to claim 1 wherein the ribbons have an average cured ply thickness of from 0.04 to 0.3 mm, from 0.04 to 0.12 mm, from 0.04 to 0.10 mm or from 0.04 to 0.08 mm.

8. A method according to claim 1 wherein the panel portion has from 6 to 24, from 12 to 24 or from 12 to 20 mutually stacked ribbons per mm thickness of the panel portion.

9. A method according to claim 1 wherein from 2 to 20 layers of sheet moulding compound are provided in the stack.

10. A method according to claim 1 wherein each layer of sheet moulding compound has been formed by (A) scattering a plurality of the ribbons either (i) onto a surface which is then coated with a resin layer or (ii) onto a resin layer, in each case to form a layer of the plurality of ribbons which are randomly distributed across the plane of the resin layer with there being gaps between adjacent ribbons and wherein at least some of the ribbons mutually overlap, the gaps defining at least 10% of the area of the resin layer, and (B) impregnating the ribbons by the resin, the impregnation causing lateral movement of at least some of the plurality of ribbons in the plane of the resin layer to reduce ribbon overlap, and to reduce the area of the gaps.

11. A method according to claim 10 wherein after the scattering step (A) the plurality of the ribbons are distributed to cover from 70 to 90% of the layer area, and the subsequent impregnating step (B) causes lateral movement of the ribbons to increase the coverage of the plurality of ribbons over the layer area.

12. A method according to claim 1 wherein in the stack of the plurality of layers of sheet moulding compound, the ribbons in the plurality of layers of sheet moulding compound at least partly overlap so that in the stack the ribbons are distributed to cover 100% of the stack area, relative to the plane of the stack.

13. A method according to claim 1 wherein each layer of sheet moulding compound has a carbon fibre volume fraction of from 40 to 55% relative to the total volume of the carbon fibre and resin in the layer.

14. A method according to claim 1 wherein each ribbon comprises from 2,000 to 50,000 carbon fibres.

15. A method according to claim 1 wherein the ribbons in each layer of sheet moulding compound are randomly oriented relative to the ribbons in each other layer of sheet moulding compound and the stack has an isotropic or quasi-isotropic carbon fibre orientation in the plane of the panel portion.

16. A method according to claim 1 wherein each layer of sheet moulding compound is formed by the following steps: (a) providing an elongate tow of carbon fibres; (b) spreading the tow of carbon fibres to form an elongate ribbon; and (c) cutting the elongate ribbon transverse to the length of the elongate ribbon to form a plurality of individual ribbons; (d) scattering the plurality of ribbons onto a surface to form a layer of the plurality of ribbons which are randomly distributed across the plane of the layer; and (e) coating a resin onto the plurality of ribbons to form the layer of sheet moulding compound.

17. A method according to claim 16 wherein in step (d) the plurality of ribbons are scattered onto a bottom layer of resin which at least partially coats the ribbons in step (e) and/or wherein in step (e) a top layer of resin is applied over the plurality of ribbons scattered onto the surface, wherein the top layer of resin at least partially coats the ribbons in step (e).

18. A method according to claim 16 further comprising the step, after step (e), of impregnating the plurality of ribbons by the coating resin, wherein the impregnating step causes lateral movement in the plane of the layer of at least some ribbons thereby to increase the area covered by the ribbons, relative to the plane of the layer.

19. A method according to claim 16 wherein in step (a) the elongate tow of carbon fibres comprises carbon fibres coated with a resin size composition and step (b) comprises the sub-steps of (b1) heating the elongate tow of carbon fibres to soften the resin size composition; (b2) spreading the spreading the tow of carbon fibres to form the elongate ribbon while the resin size composition is in a softened state; and (b3) cooling the spread ribbon to harden the resin size composition.

20. A method according to claim 19 wherein in step (b1) the elongate tow of carbon fibres is heated by infrared radiation.

21. A method according to claim 16 further comprising the step, between steps (b) and (c), of applying a binder composition to the elongate ribbon of carbon fibres.

22. A method according to claim 16 wherein in step (d) the plurality of ribbons are scattered onto a surface and a levelling force is applied to the plurality of ribbons to level out the distribution of the plurality of ribbons across the plane of the layer of the plurality of ribbons, wherein in step (d) the levelling force is applied to the plurality of ribbons by vibrating the layer of the plurality of ribbons to level out the distribution of the plurality of ribbons across the plane of the layer of the plurality of ribbons.

23. A method according to claim 22 wherein in step (d) the layer of the plurality of ribbons is formed on a conveyor and the conveyor surface is vibrated to provide the levelling force.

24. A method according to claim 16 wherein in step (d) the surface comprises a flexible carrier web coated with a layer of the resin, and/or during or after step (e) a flexible covering web is applied over the resin coated ribbons.

25. A method according to claim 16 wherein after step (c) and before the ribbons are scattered onto the surface in step (d) the plurality of ribbons are mechanically worked in a splitting step to split, lengthwise in a direction along the fibre direction, at least some of the plurality of individual ribbons formed in step (c) into respective two or more ribbons of smaller width, transverse to the fibre direction, as compared to the individual ribbons formed in step (c).

26. A method according to claim 25 wherein prior to the splitting step the ribbons have a width of from 8 to 44 mm and after the splitting step the ribbons have a width of from 1 to less than 20 mm, or less than 8 mm or wherein prior to the splitting step the ribbons have a width of from greater than 4 to up to 30 mm, or up to 16 mm, and after the splitting step the ribbons have a width of from 1 to 10 mm, or up to 4 mm.

27. A method according to claim 25 wherein prior to the splitting step the ribbons comprise from 10,000 to 50,000 carbon fibres and after the splitting step the ribbons comprise from 2,000 to 20,000 carbon fibres.

28. A method according to claim 16 wherein in step (a) a plurality of parallel elongate tows of carbon fibres is provided which forms a web of the plurality of parallel elongate tows of carbon fibres, and the web is conveyed through a common spreader, which spreads the tows of carbon fibres in step (b) to form a plurality of parallel elongate ribbons, and is then conveyed into a common fibre cutter which in step (c) cuts the plurality of elongate ribbons.

29. A method according to claim 1 wherein in step i the resin is a curable thermosetting resin selected from the group consisting of an epoxy resin and a vinyl ester resin, and in step iv the curable resin is substantially fully cured, and in step i in each layer of sheet moulding compound the resin at least partially impregnates the carbon fibres in the ribbons.

30. A method according to claim 1 wherein in step iii the stack of layers is shaped and dimensioned to cover from 95 to 100% of the moulding area.

31. A method according to claim 1 wherein the panel part of the stack formed in step iii has a thickness that from 0 to 20%, or from 0 to 10%, greater than the thickness of the panel portion in the moulded part formed in step v.

32. A method according to claim 1 wherein the maximum flow length distance from the peripheral edge of the stack to the peripheral edge of the moulding area is within the range of from 0 to 25 mm, from 0 to 10 mm or from 0 to 5 mm.

33. A method according to claim 1 wherein the maximum flow length distance from the peripheral edge of the stack to the peripheral edge of the moulding area is no more than 4L, or no more than 2L, where L is the average carbon fibre length of the ribbons.

34. A method according to claim 1 wherein the layer of sheet moulding compound has a carbon fibre areal weight of from 100 to 600 g/m$^2$, from 100 to 400 g/m$^2$ from 150 to 400 g/m$^2$ or from 150 to 300 g/m$^2$.

35. A method according to claim 1 wherein the panel portion has a carbon fibre areal weight of from 500 to 1500 g/m$^2$ or from 500 to 1400 g/m$^2$.

36. A method according to claim 1 wherein the panel portion has an area of greater than 1 m$^2$ and is a vehicle panel, or a vehicle body panel.

37. A method according to claim 1 wherein in each layer of sheet moulding compound the ribbons are distributed to cover from 90 to 99% of the plane of the layer.

38. A method of moulding a moulding material to form a moulded part of fibre-reinforced resin matrix composite material, the method comprising the steps of:
  i. providing a plurality of layers of sheet moulding compound, each layer comprising a plurality of ribbons randomly distributed across the plane of the respective layer and at least partly coated by a resin, each ribbon comprising a bundle of mutually aligned carbon fibres and being randomly oriented within the plane of the layer, in each layer of sheet moulding compound the ribbons are distributed to cover less than 100% of the plane of the layer, wherein each layer of sheet moulding compound is formed by the following steps: (a) providing an elongate tow of carbon fibres; (b) spreading the tow of carbon fibres to form an elongate ribbon; and (c) cutting the elongate ribbon transverse to the length of the elongate ribbon to form a plurality of individual ribbons; (d) scattering the plurality of ribbons onto a surface to form a layer of the plurality of ribbons which are randomly distributed across the plane of the layer; and (e) coating a resin onto the plurality of ribbons to form the layer of sheet moulding compound, wherein in step (d) the plurality of ribbons are scattered onto a surface and a levelling force is applied to the plurality of ribbons to level out the distribution of the plurality of ribbons across the plane of the layer of the plurality of ribbons, wherein in step (d) the levelling force is applied to the plurality of ribbons by vibrating the layer of the plurality of ribbons to level out the distribution of the plurality of ribbons across the plane of the layer of the plurality of ribbons;
  ii. assembling the plurality of layers as a stack;
  iii. locating the stack in a moulding area of a mould tool, the mould tool defining a peripheral edge of the moulding area, wherein the stack of layers is shaped and dimensioned to cover from 90 to 100% of the moulding area and a peripheral edge of the stack is located at or inwardly of the peripheral edge of the moulding area, the stack of layers defining a panel part;
  iv. applying a moulding pressure to an upper surface of the stack and causing the sheet moulding compound to flow and fill a mould cavity, defined by the moulding area, of the mould tool; and
  v. solidifying the resin to form a moulded part from the moulding material, wherein the moulded part includes a panel portion formed from the panel part.

39. A method according to claim 38 wherein in each layer of sheet moulding compound the ribbons are distributed to cover from 90 to 99% of the plane of the layer.

40. A method of moulding a moulding material to form a moulded part of fibre-reinforced resin matrix composite material, the method comprising the steps of:
  i. providing a plurality of layers of sheet moulding compound, each layer comprising a plurality of ribbons randomly distributed across the plane of the respective layer and at least partly coated by a resin, each ribbon comprising a bundle of mutually aligned carbon fibres and being randomly oriented within the plane of the layer, in each layer of sheet moulding compound the ribbons are distributed to cover less than 100% of the plane of the layer, wherein each layer of sheet moulding compound is formed by the following steps: (a) providing an elongate tow of carbon fibres; (b) spreading the tow of carbon fibres to form an elongate ribbon; and (c) cutting the elongate ribbon transverse to the length of the elongate ribbon to form a plurality of individual ribbons; (d) scattering the plurality of ribbons onto a surface to form a layer of the plurality of ribbons which are randomly distributed across the plane of the layer; and (e) coating a resin onto the plurality of ribbons to form the layer of sheet moulding compound, wherein after step (c) and before the ribbons are scattered onto the surface in step (d) the plurality of ribbons are mechanically worked in a splitting step to split, lengthwise in a direction along the fibre direction, at least some of the plurality of individual ribbons formed in step (c) into respective two or more ribbons of smaller width, transverse to the fibre direction, as compared to the individual ribbons formed in step (c), wherein prior to the splitting step the ribbons have a width of from 8 to 44 mm and after the splitting step the ribbons have a width of from 1 to less than 20 mm, or wherein prior to the splitting step the ribbons have a width of from greater than 4 to up to 30 mm, and after the splitting step the ribbons have a width of from 1 to 10 mm;
  ii. assembling the plurality of layers as a stack;
  iii. locating the stack in a moulding area of a mould tool, the mould tool defining a peripheral edge of the moulding area, wherein the stack of layers is shaped and dimensioned to cover from 90 to 100% of the moulding area and a peripheral edge of the stack is located at or inwardly of the peripheral edge of the moulding area, the stack of layers defining a panel part;
  iv. applying a moulding pressure to an upper surface of the stack and causing the sheet moulding compound to flow and fill a mould cavity, defined by the moulding area, of the mould tool; and
  v. solidifying the resin to form a moulded part from the moulding material, wherein the moulded part includes a panel portion formed from the panel part.

41. A method according to claim 40 wherein in each layer of sheet moulding compound the ribbons are distributed to cover from 90 to 99% of the plane of the layer.

42. A method of moulding a moulding material to form a moulded part of fibre-reinforced resin matrix composite material, the method comprising the steps of:
  i. providing a plurality of layers of sheet moulding compound, each layer comprising a plurality of ribbons randomly distributed across the plane of the respective layer and at least partly coated by a resin, each ribbon comprising a bundle of mutually aligned carbon fibres and being randomly oriented within the plane of the layer, in each layer of sheet moulding compound the ribbons are distributed to cover less than 100% of the plane of the layer, wherein each layer of sheet moulding compound is formed by the following steps: (a) providing an elongate tow of carbon fibres; (b) spreading the tow of carbon fibres to form an elongate ribbon; and (c) cutting the elongate ribbon transverse to the length of the elongate ribbon to form a plurality of individual ribbons; (d) scattering the plurality of ribbons onto a surface to form a layer of the plurality of ribbons which are randomly distributed across the plane of the layer; and (e) coating a resin onto the plurality of ribbons to form the layer of sheet moulding compound, wherein after step (c) and before the ribbons are scattered onto the surface in step (d) the plurality of ribbons are mechanically worked in a splitting step to split, lengthwise in a direction along the fibre direction, at least some of the plurality of individual ribbons formed in step (c) into respective two or more ribbons of smaller width, transverse to the fibre direction, as compared to the individual ribbons formed in step (c), wherein prior to the splitting step the ribbons comprise from 10,000 to 50,000 carbon fibres and after the splitting step the ribbons comprise from 2,000 to 20,000 carbon fibres;

ii. assembling the plurality of layers as a stack;

iii. locating the stack in a moulding area of a mould tool, the mould tool defining a peripheral edge of the moulding area, wherein the stack of layers is shaped and dimensioned to cover from 90 to 100% of the moulding area and a peripheral edge of the stack is located at or inwardly of the peripheral edge of the moulding area, the stack of layers defining a panel part;

iv. applying a moulding pressure to an upper surface of the stack and causing the sheet moulding compound to flow and fill a mould cavity, defined by the moulding area, of the mould tool; and v. solidifying the resin to form a moulded part from the moulding material, wherein the moulded part includes a panel portion formed from the panel part.

43. A method according to claim 42 wherein in each layer of sheet moulding compound the ribbons are distributed to cover from 90 to 99% of the plane of the layer.

* * * * *